(12) United States Patent
Hitnalli et al.

(10) Patent No.: US 11,685,341 B2
(45) Date of Patent: Jun. 27, 2023

(54) COMPOSITE WIPER BLADE ASSEMBLY (71) Applicant: Rosemount Aerospace Inc., Burnsville, MN (US)

(72) Inventors: Vishwanath Hitnalli, Karnataka (IN); Venkata Anil Kumar Mothe, Karnataka (IN); Jai Kumar Gowda, Karnataka (IN); Kotturswamy Haluvagalu, Karnataka (IN)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 17/408,021

(22) Filed: Aug. 20, 2021

(65) Prior Publication Data
US 2022/0289145 A1 Sep. 15, 2022

(30) Foreign Application Priority Data
Mar. 15, 2021 (IN) .............................. 202141010943

(51) Int. Cl.
*B60S 1/38* (2006.01)
*B60S 1/40* (2006.01)

(52) U.S. Cl.
CPC .............. *B60S 1/3848* (2013.01); *B60S 1/38* (2013.01); *B60S 1/3875* (2013.01); *B60S 1/3886* (2013.01);
(Continued)

(58) Field of Classification Search
CPC ........ B60S 1/38; B60S 1/3848; B60S 1/3874; B60S 1/3877; B60S 1/3801; B60S 1/3886; B60S 2001/3822; B60S 2001/3841; B60S 2001/3817; B60S 2001/3818; B60S 2001/3812; B60S 1/3875
(Continued)

(56) References Cited

U.S. PATENT DOCUMENTS

| 1,749,049 A | * | 3/1930 | Turner | ...................... B60S 1/38 15/250.4 |
| 2,149,037 A | * | 2/1939 | Zalger | ...................... B60S 1/38 15/250.41 |

(Continued)

FOREIGN PATENT DOCUMENTS

| CN | 202345631 U | 7/2012 |
| DE | 10312979 A1 | 10/2004 |

(Continued)

OTHER PUBLICATIONS

Machine language translation of description portion of Japanese publication 61-163046, published Jul. 1986. (Year: 1986).*

(Continued)

*Primary Examiner* — Gary K. Graham
(74) *Attorney, Agent, or Firm* — Kinney & Lange, P.A.

(57) ABSTRACT

An aircraft windshield wiper system includes a wiper arm, a wiper blade coupled to a first end of the wiper arm, and an output shaft coupled to a second end of the wiper arm. The wiper blade includes a support member coupled to a blade element through a clip and a fastener extending through the blade element. The support member can be made from a composite material and the clip and fastener allow for attachment of the blade element to the support member without piercing the support member.

19 Claims, 3 Drawing Sheets

(52) U.S. Cl.
CPC ............... *B60S 2001/3812* (2013.01); *B60S 2001/3817* (2013.01); *B60S 2001/3822* (2013.01); *B60S 2001/4054* (2013.01)

(58) Field of Classification Search
USPC ............ 15/250.44, 250.361, 250.43, 250.46, 15/250.47
See application file for complete search history.

(56) References Cited

U.S. PATENT DOCUMENTS

| | | | | |
|---|---|---|---|---|
| 2,265,266 | A * | 12/1941 | Cote | A47L 1/06 15/250.31 |
| 2,276,556 | A * | 3/1942 | Zaiger | B60S 1/4041 15/250.43 |
| 2,537,411 | A * | 1/1951 | Klinger | B60S 1/365 15/250.43 |
| 2,601,664 | A * | 6/1952 | Nesson | B60S 1/38 15/250.44 |
| 2,616,113 | A * | 11/1952 | Scinta | B60S 1/38 15/250.47 |
| 3,372,421 | A | 3/1968 | Meltzer | |
| 5,412,834 | A | 5/1995 | Burkard et al. | |
| 6,308,373 | B1 | 10/2001 | Merkel et al. | |
| 6,427,283 | B1 * | 8/2002 | Dietrich | B60S 1/38 15/250.43 |
| 7,350,259 | B2 | 4/2008 | Walworth et al. | |
| 8,438,692 | B2 | 5/2013 | Ollier | |

FOREIGN PATENT DOCUMENTS

| | | |
|---|---|---|
| DE | 102018251711 A1 | 7/2020 |
| JP | 61-163046 * | 7/1986 |

OTHER PUBLICATIONS

Extended European Search Report for EP Application No. 22161971.1, dated Aug. 1, 2022, pp. 4.

* cited by examiner

COMPOSITE WIPER BLADE ASSEMBLY

BACKGROUND

This application claims the benefit of Indian Provisional Application No. 202141010943 filed Mar. 15, 2021 for "COMPOSITE WIPER BLADE ASSEMBLY" by V. Hitnalli, V. A. K. Mothe, J. K. Gowda and K. Haluvagalu.

The present disclosure relates to windshield wiper systems, and in particular to a windshield wiper system used on an aircraft.

Aircraft windshield wiper systems are used to wipe and clean water or other debris from an aircraft windshield, allowing better visibility out the windshield for both the pilot and co-pilot. Windshield wiper systems include a wiper arm and a wiper blade that sweep back and forth across a windshield within specific sweep angle requirements, cleaning the windshield for the pilot and co-pilot. Traditionally, the wiper blade includes a frame and a rubber blade coupled to the frame by rivets extending through both the frame and the rubber blade. The rivets extending through both components creates locations of weakness in the wiper blade, allowing the wiper blade to bend or flex during high-speed operation of the windshield wiper system and overshoot the sweep angle requirements. As such, traditional wiper blades encounter difficulties in meeting the required sweep angle limits specified by the airlines or the aircraft manufacturers.

SUMMARY

According to one aspect of the disclosure, a wiper blade for use on a windshield of an aircraft is disclosed. The wiper blade includes a support member coupled to a blade element, a clip, a fastener, and a coupler. The clip is coupled to and surrounds at least a portion of the support member and at least a portion of the blade element. The fastener extends through the blade element and the clip, securing the clip to the blade element. The coupler is coupled to and surrounds at least a portion of the support member and at least a portion of the blade element.

According to another aspect of the disclosure, a windshield wiper system for use on a windshield of an aircraft is disclosed. The windshield wiper system includes a wiper including a wiper arm and a wiper blade coupled to a first end of the wiper arm and an actuator including an output shaft coupled to a second end of the wiper arm. The actuator is configured to oscillate the output shaft to sweep the wiper in an arc across the windshield of the aircraft. The wiper blade includes a support member coupled to a blade element, a clip, and a fastener. The clip is coupled to and surrounds at least a portion of the support member and at least a portion of the blade element. The fastener extends through the blade element and the clip, securing the clip to the blade element.

DETAILED DESCRIPTION

Figure 1A:
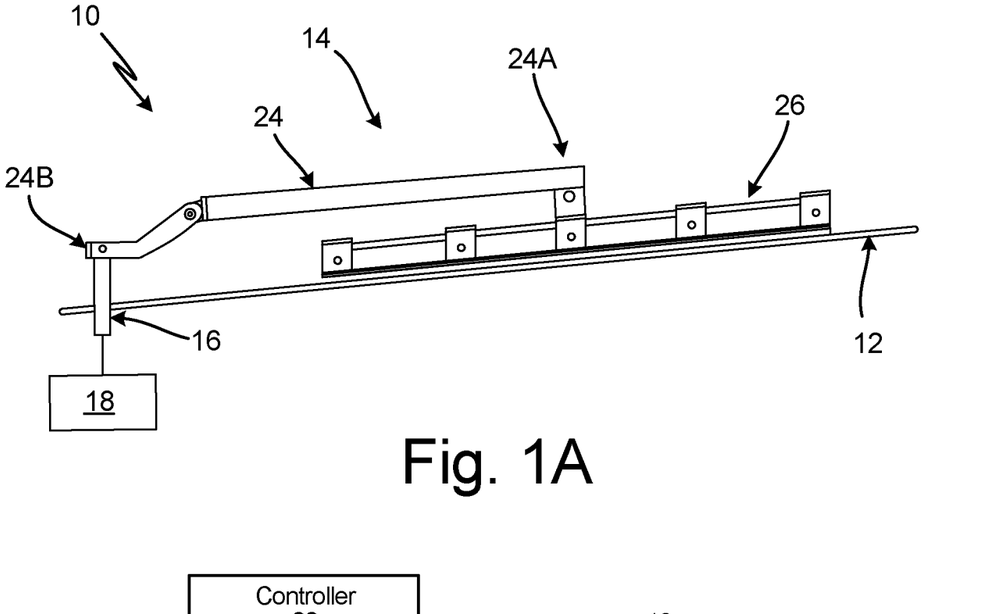
FIG. 1A is a side view of a windshield wiper system on an aircraft windshield.
Figure 1B:
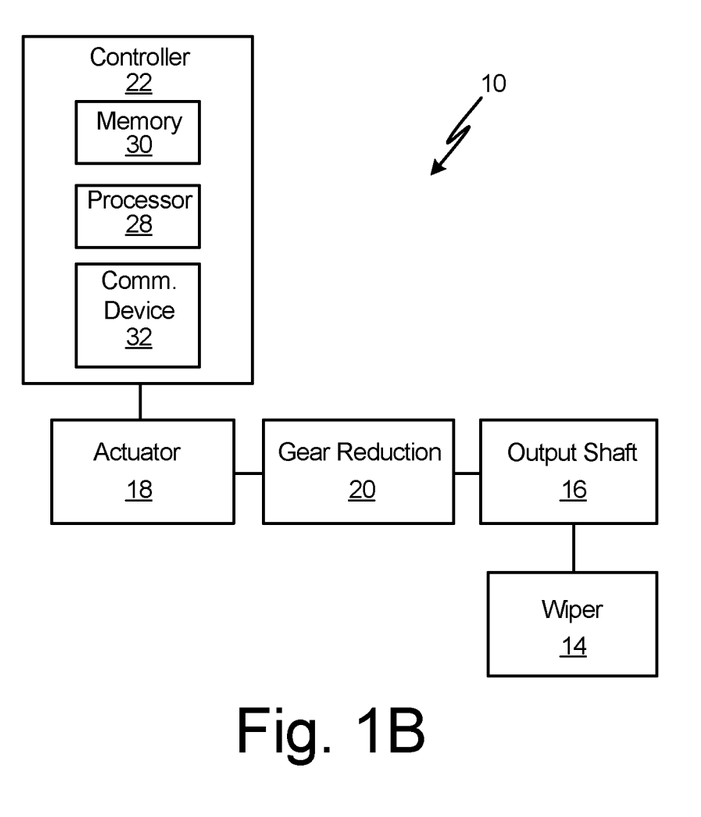
FIG. 1B is a schematic block diagram of the windshield wiper system.

FIG. 1A is a side view of windshield wiper system 10 on windshield 12 of an aircraft (not shown). FIG. 1B is a schematic block diagram of windshield wiper system 10. FIGS. 1A-1B will be discussed together. Further, hereinafter windshield wiper system 10 will be referred to as WWS 10. WWS 10 includes wiper 14, output shaft 16, actuator 18, gear reduction 20, and controller 22. WWS 10 is installed on an aircraft and WWS 10 is configured to clear windshield 12 of rain or other debris.

Wiper 14 includes wiper arm 24 and wiper blade 26. Wiper arm 24 includes first end 24A positioned at a distal end of wiper arm 24 and second end 24B positioned at an opposite distal end of wiper 14 as first end 24A. Wiper blade 26 is coupled to first end 24A of wiper arm 24 through a coupler, discussed further below. Wiper arm 24 can be constructed from a polymer, a composite, a metal, or at least partially from one or more of the listed materials. Wiper arm 24 is coupled to output shaft 16 at second end 24B of wiper arm 24 through a mechanical connection, such as a threaded or clamping connection. Output shaft 16 extends through a body portion of the aircraft adjacent windshield 12 but not through windshield 12. Output shaft 16 is configured to rotate about its central axis, providing rotational energy to second end 24B of wiper arm 24, which in turn forces wiper 14 to traverse across windshield 12 in a sweeping motion.

Actuator 18 is coupled to output shaft 16 within the body portion of the aircraft. Actuator 18 is configured to provide rotational energy to output shaft 16, rotating output shaft 16 about its central axis. The rotation of output shaft 16 forces wiper 14 to traverse across windshield 12 in a sweeping motion, therefore actuator 18 provides the energy necessary to drive motion of wiper 14. In the embodiment shown, actuator 18 is a brushless direct current motor. In another embodiment, actuator 18 can be a brushed direct current motor or any other motor configured to provide rotational energy to output shaft 16. Further, actuator 18 is a bi-directional motor that can operate in both directions, allowing output shaft 16, wiper arm 24, and wiper blade 26 to travel across windshield 12 in both directions. Actuator 18 is coupled to output shaft 16 through gear reduction 20, in which gear reduction 20 is positioned between output shaft 16 and actuator 18. In other words, gear reduction 20 is positioned within the body of the aircraft, coupled at one end to output shaft 16, and coupled at the other end to actuator 18. Gear reduction 20 has a large gear ratio (greater than 3:1), meaning that many rotations of actuator 18 cause only a few degrees of rotation of wiper 14. Gear reduction 20 is configured to provide precise angular rotation of wiper 14. In the embodiment shown in FIG. 1B, output shaft 16, actuator 18, and gear reduction 20 are shown as separate components. In another embodiment, gear reduction 20 can be integral with actuator 18 such that actuator 18, gear reduction 20, and output shaft 16 are a single assembly.

In the example shown, controller 22 includes processor(s) 28, memory 30, and communication device(s) 32. However, in certain examples, controller 22 can include more or fewer components than components 28, 30, and 32. Processor(s) 28, in one example, are configured to implement functionality and/or process instructions for execution within controller 22. For instance, processor(s) 28 can be capable of processing instructions stored in memory 30. Examples of processor(s) 28 can include any one or more of a microprocessor, a digital signal processor (DSP), an application specific integrated circuit (ASIC), a field-programmable gate array (FPGA), or other equivalent discrete or integrated logic circuitry.

Memory 30 can be configured to store information within controller 22 during operation of WWS 10. Memory 30, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 30 is a temporary memory, meaning that a primary purpose of memory 30 is not long-term storage. Memory 30, in some examples, is described as volatile memory, meaning that memory 30 does not maintain stored contents when power to controller 22 is turned off. Examples of volatile memories can include random access memories (RAM), dynamic random-access memories (DRAM), static random-access memories (SRAM), and other forms of volatile memories. In some examples, memory 30 is used to store program instructions for execution by processor(s) 28. Memory 30, in one example, is used by software or applications running on controller 22 (e.g., a software program implementing a system architecture) to temporarily store information during program execution. Memory 30, in some examples, also includes one or more computer-readable storage media. Memory 30 can be configured to store larger amounts of information than volatile memory. Memory 30 can further be configured for long-term storage of information. In some examples, memory 30 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

Controller 22, in some examples, also includes communication device(s) 32. Controller 22, in one example, utilizes communication device(s) 32 to communicate with external devices via one or more networks, such as one or more wireless or wired networks or both. Communication device (s) 32 can be a network interface card, such as an Ethernet card, an optical transceiver, a radio frequency transceiver, or any other type of device that can send and receive information. Other examples of such network interfaces can include Bluetooth, 3G, 4G, 5G, and Wi-Fi radio computing devices as well as Universal Serial Bus (USB).

Controller 22 is positioned within the body portion of the aircraft and controller 22 is communicatively coupled to actuator 18. Controller 22 can be communicatively coupled to each component through electrical wires or a wireless connection to send and receive signals from actuator 18. More specifically, controller 22 is communicatively coupled to actuator 18 through a wired or wireless connection and controller 22 is configured to send signals to actuator 18 to control operation of actuator 18. As such, controller 22 can send electrical signals to and receive electrical signals from actuator 18 to control rotation of output shaft 16 of actuator 18.

Figure 2A:
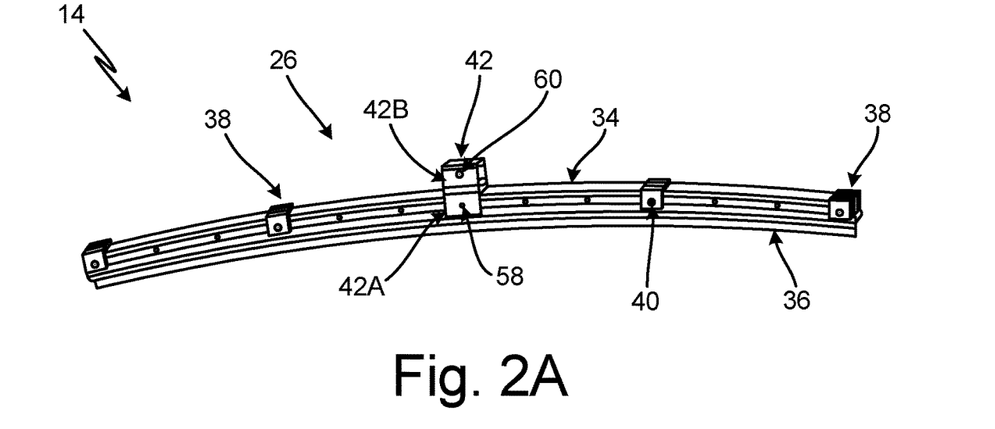
FIG. 2A is a perspective view of a wiper blade of the windshield wiper system.
Figure 2B:
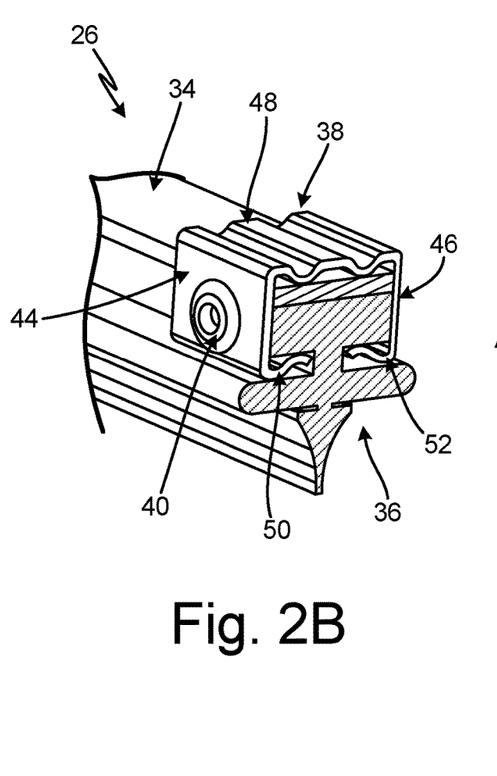
FIG. 2B is a close-up perspective view of a portion of the wiper blade.
Figure 2C:
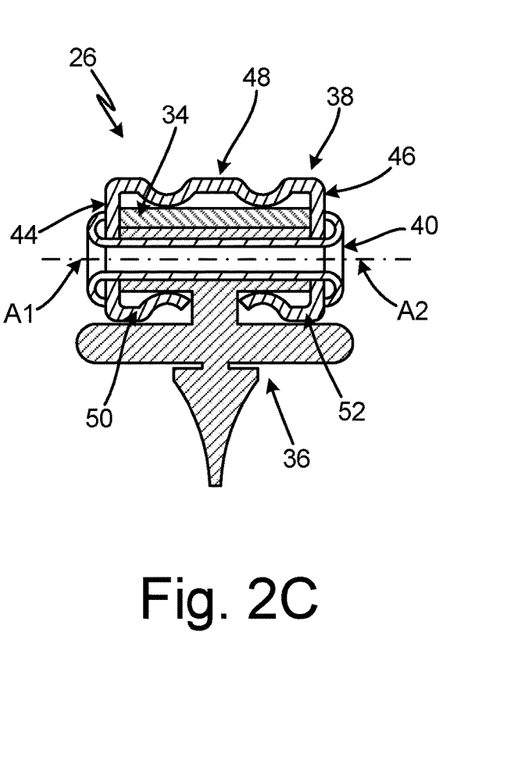
FIG. 2C is a cross-sectional view of a portion of the wiper blade.

FIG. 2A is a perspective view of wiper blade 26 of WWS 10. FIG. 2B is a close-up perspective view of a portion of wiper blade 26. FIG. 2C is a cross-sectional view of a portion of wiper blade 26. FIGS. 2A-2C will be discussed together. Wiper blade 26 includes support member 34, blade element 36, clip 38, fastener 40, and coupler 42. Support member 34 is coupled to blade element 36 and clip 38 is coupled to and surrounds at least a portion of support member 34 and at least a portion of blade element 36. Likewise, coupler 42 is coupled to and surrounds at least a portion of support member 34 and at least a portion of blade element 36. Fastener 40 extends through blade element 36 and clip 38, securing clip 38 to blade element 36. Each respective component will be discussed further below.

Support member 34 is a structural component that provides rigidity to wiper blade 26 during operation of WWS 10. In the embodiment shown, support member 34 includes a rectangular cross-section extending the length of wiper blade 26, providing stiffness and rigidity to wiper blade 26 to prevent undesirable deflection of wiper blade 26 in the sweeping directions. In another embodiment, support member 34 can include a cross-section of any shape that extends a full or partial length of wiper blade 26. Support member 34 can be constructed from a composite material, metallic material, or polymer material. In one example, support member 34 can be constructed from a carbon fiber reinforced polymer. Support member 34 is coupled to blade element 36 through an adhesive positioned between support member 34 and blade element 36 and extending a substantial length of support member 34. In one example, the adhesive used to couple support member 34 to blade element 36 is a polyurethane adhesive.

Blade element 36 is the component of wiper blade 26 that is configured to interface with windshield 12 to clear windshield 12 of water or other debris. Blade element 36 has a complex cross-sectional shape including a rectangular top portion and a generally triangular bottom portion configured to contact and clean windshield 12 on the aircraft. In some embodiments, blade element 36 can also include necked down portions and wider portions positioned between the rectangular top portion and the generally triangular bottom portion. Blade element 36 can be constructed from a rubber material, such as in one example blade element 36 is constructed from a nitrile rubber. Blade element 36 can have a length that is less than a length of support member 34. During the adhesion of support member 34 to blade element 36, blade element 36 is stretched which causes support member 34 to flex into a curved configuration (shown in FIG. 2A), conforming to the shape of windshield 12. As shown best in FIG. 2A, blade element 36 also includes a plurality of apertures extending through the rectangular top portion of blade element 36, with the plurality of apertures spaced along the length of blade element 36. The plurality of apertures of blade element 36 are configured to receive fastener 40 for securing clip 38 to blade element 36, discussed further below.

Clip 38 is a component of wiper blade 26 that is configured to provide additional attachment support between support member 34 and blade element 36. More specifically, clip 38 is coupled to both support member 34 and blade element 36, and clip 38 surrounds at least a portion of each of support member 34 and blade element 36. Clip 38 is configured to exert a clamping force on support member 34 and blade element 36, compressing support member 34 and blade element 36 together. Clip 38 can be constructed from a metal, a polymer, or a composite material. In one example, clip 38 can be constructed from a spring steel to facilitate the clamping force exerted on support member 34 and blade element 36. In the embodiment shown in FIG. 2A, wiper blade 26 includes four clips 38 coupled to support member 34 and blade element 36. In another example, wiper blade 26 can include more or less than four clips 38 coupled to support member 34 and blade element 36. The number of clips 38 coupled to wiper blade 26 depends on various factors, such as the length of wiper blade 26 and the forces exerted on wiper blade 26, among other factors. In one example, wiper blade 26 includes two inner clips 38 spaced equidistance from coupler 42 and two outer clips 38 adjacent the distal ends of wiper blade 26 that are also spaced equidistance from coupler 42.

Figure 3A:
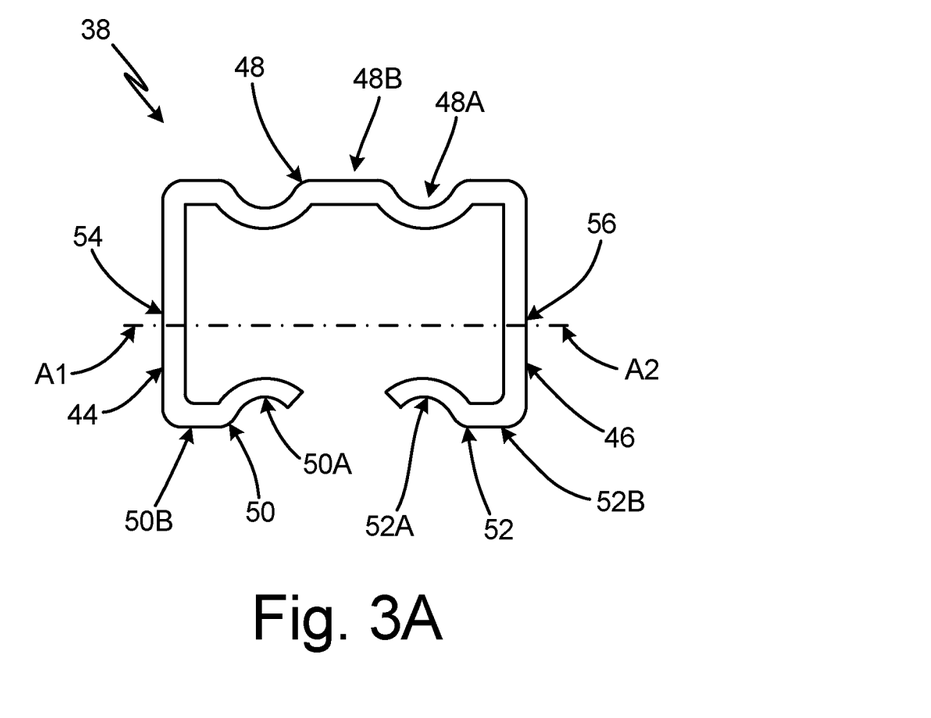
FIG. 3A is a front view of the clip used with the wiper blade.
Figure 3B:
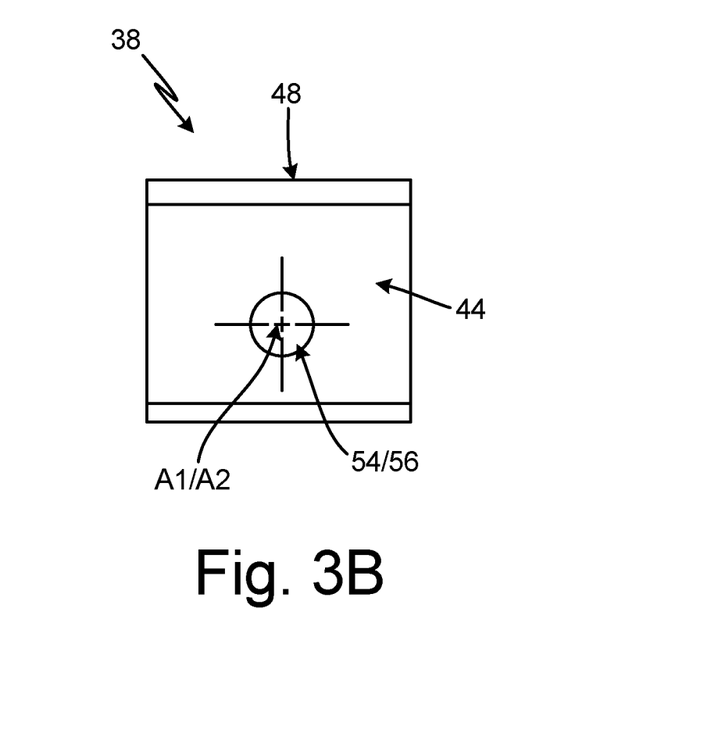
FIG. 3B is a side view of the clip used with the wiper blade.

Referring now to FIGS. 3A-3B, which show a front view and a side view of clip 38, respectively. Clip 38 includes first side surface 44, second side surface 46, top surface 48, first partial bottom surface 50, second partial bottom surface 52, first aperture 54, and second aperture 56. In the embodiment shown, first side surface 44 is parallel with second side surface 46 and top surface 48 extends between and connects first side surface 44 to second side surface 46. In another embodiment, first side surface 44 may not be parallel with second side surface 46. First partial bottom surface 50 extends from first side surface 44 inward toward a center plane of clip 38 and toward second side surface 46, but first partial bottom surface 50 does not reach the center plane of clip 38. Second partial bottom surface 52 extends from second side surface 46 inward toward a center plane of clip 38 and toward first side surface 44, but second partial bottom surface 52 does not reach the center plane of clip 38. First aperture 54 extends through first side surface 44 below a center plane of the height of first side surface 44. Second aperture 56 extends through second side surface 46 below a center plane of the height of second side surface 46. First aperture 54 and second aperture 56 are aligned such that axis A1 of first aperture 54 is aligned with axis A2 of second aperture 56. In the embodiment shown, first aperture 54 and second aperture 56 are positioned below a center plane of the height of clip 38 to allow fastener 40 to extend only through blade element 36 and not through support member 34. In another embodiment, first aperture 54 and second aperture 56 can be positioned above or at the center plane of the height of clip 38 to allow fastener 40 to extend only through blade element 36 and not through support member 34, depending on the geometry of blade element 36 and support member 34. In some examples, first aperture 54 and second aperture 56 can have the same diameter. In other examples, first aperture 54 and second aperture 56 may have different diameters.

As shown in FIG. 3A-3B, clip 38 includes first side surface 44, second side surface 46, top surface 48, first partial bottom surface 50, and second partial bottom surface 52. In some examples, top surface 48 can include at least one curved surface 48A and at least one flat surface 48B; first partial bottom surface 50 can include at least one curved surface 50A and at least one flat surface 50B; and second partial bottom surface 52 can include at least one curved surface 52A and at least one flat surface 52B. In the embodiment shown in FIGS. 2A-3B, clip 38 includes a specific ribbed shape with flat and curved surfaces. In another embodiment, clip 38 can include any cross-sectional shape as long as clip 38 is coupled to and surrounds at least a portion of support member 34 and blade element 36. In one example, clip 38 can include a generally rectangular cross-section such that the described curved portions are not included in clip 38.

In the example shown in FIG. 3A, top surface 48 includes flat surface 48B extending from first side surface 44 toward second side surface 46, followed by curved surface 48A extending inward toward an interior of clip 38, followed by flat surface 48B, followed by curved surface 48A extending inward toward an interior of clip 38, and then flat surface 48B meeting with second side surface 46. First partial bottom surface 50 includes flat surface 50B extending from first side surface 44 toward second side surface 46 and curved surface 50A extending inward toward an interior of clip 38. Second partial bottom surface 52 includes flat surface 52B extending from second side surface 46 toward first side surface 44 and curved surface 52A extending inward toward an interior of clip 38. As shown best in FIGS. 2B-2C, the curved surfaces 48A of top surface 48 are adjacent and contact support member 34 and curved surface 50A of first partial bottom surface 50 and curved surface 52A of second partial bottom surface 52 are adjacent and contact blade element 36. The contact of the curved surfaces 48A, 50A, and 52A on support member 34 and blade element 36 concentrates the clamping force of clip 38 to specific line of contact locations, increasing the clamping force that can be achieved by clip 38. As discussed, the clamping force exerted by clip 38 compresses support member 34 and blade element 36 together, ensuring support member 34 and blade element 36 do not separate during operation of WWS 10.

Referring again to FIGS. 2A-2C, clips 38 are installed on wiper blade 26 by inserting clips 38 over the distal ends of wiper blade 26 and then positioning clips 38 at the desired location on wiper blade 26. More specifically, clips 38 are inserted over the distal ends of the adhered support member 34 and blade element 36. Then clip 38 is slid down support member 34 and blade element 36 until first aperture 54 and second aperture 56 of clip 38 are aligned with a desired one of the plurality of apertures spaced along the length of blade element 36. Once first aperture 54 and second aperture 56 are aligned with the desired aperture on blade element 36, fastener 40 is inserted through each of the apertures and secures clip 38 to blade element 36. Fastener 40 extends through first aperture 54 of first side surface 44 of clip 38, fastener 40 extends through the aperture within blade element 36, fastener 40 extends through second aperture 56 of second side surface 46 of clip 38, and fastener 40 protrudes outward from second aperture 56 of second side surface 46 of clip 38. Fastener 40 can extend through each clip 38 coupled to support member 34 and blade element 36. As such, in an embodiment including four clips 38, there will be four fasteners 40 securing the four clips 38 to support member 34 and blade element 36. The number of fasteners 40 will depend on the number of clips 38 on wiper blade 26. Fastener 40 can be a hollow rivet, standard rivet, bolt and nut, pin and clevis, pin and clamp, among other options.

Fastener 40 is configured to extend through only clip 38 and the rectangular top portion of blade element 36 to secure clip 38 to blade element 36, which further secures support member 34 and blade element 36 together in compression. Fastener 40 does not extend through support member 34 in an effort to eliminate apertures within support member 34. Any apertures extending through support member 34 could reduce the rigidity and stiffness of support member 34, limiting the usefulness of support member 34 during operation of WWS 10. A support member 34 including apertures could result in increased deflection of wiper blade 26 during operation of WWS 10, as compared to a wiper blade 26 without apertures extending through support member 34. Increased deflection of wiper blade 26 could result in damage to wiper blade 26 and/or a nonconforming WWS 10 based on unsatisfactory sweep angle limits. As such, it is advantageous for WWS 10 to avoid or eliminate apertures extending through support member 34 to reduce deflection of wiper blade 26 during operation of WWS 10.

As shown in FIG. 2A, coupler 42 is positioned at a center position with respect to a length of support member 34 and coupler 42 extends outward from support member 34 in a direction opposite of blade element 36. Similar to clip 38, coupler 42 is coupled to and surrounds at least a portion of support member 34 and at least a portion of blade element 36. Coupler 42 includes lower portion 42A, upper portion 42B, lower aperture 58, and upper aperture 60. Lower portion 42A includes lower aperture 58 extending through both walls of lower portion 42A of coupler 42. Upper portion 42B extends from lower portion 42A in a direction opposite the direction of blade element 36. Upper portion 42B includes upper aperture 60 extending through both walls of upper portion 42B of coupler 42. Coupler 42 is configured to couple to support member 34 and blade element 36 at one end and couple to an end of wiper arm 24 at the other end. More specifically, lower portion 42A is configured to be coupled to support member 34 and blade element 36 and upper portion 42B is configured to be coupled to an end of wiper arm 24. As such, coupler 42 is configured to secure wiper blade 26 to wiper arm 24 of WWS 10.

In the embodiment shown, upper portion 42B of coupler 42 includes a hollow rectangular cross-section that is configured to be inserted over a mating shaped feature on an end of wiper arm 24. In another embodiment, upper portion 42B can include a cross-section of any shape that is configured to mate with a correspondingly shaped feature on an end of wiper arm 24. A fastener can be inserted through upper aperture 60 of upper portion of coupler 42, securing coupler 42 to wiper arm 24. The fastener can be any type of mechanical attachment, including but not limited to a hollow rivet, standard rivet, bolt and nut, pin and clevis, and pin and clamp. Lower portion 42A of coupler 42 is essentially identical as clip 38 and therefore will not be discussed again in detail. Lower portion 42A of coupler 42 is assembled onto an adhered support member 34 and blade element 36 by sliding coupler 42 over a distal end of wiper blade 26 and then sliding coupler 42 to the desired aperture within blade element 36. Fastener 40 can be inserted and extend through lower aperture 58 of lower portion 42A of coupler 42 and extend through the aperture within blade element 36, securing coupler 42 to blade element 36. Coupler 42 exerts a clamping force on support member 34 and blade element 36 compressing support member 34 and blade element 36 together, ensuring support member 34 and blade element 36 do not separate during operation of WWS 10. Further, coupler 42 is the component of wiper blade 26 that is configured to secure wiper blade 26 to wiper arm 24 during operation of WWS 10.

Wiper blade 26 provides a unique solution for attaching support member 34 to blade element 36 through clip 38 and fastener 40 and for attaching wiper blade 26 to wiper arm 24 through coupler 42. Eliminating apertures in support member 34 provides many benefits over traditional bridge or beam type wiper blades that will be appreciated by those skilled in the art. Support member 34 provides increased strength characteristics of wiper blade 26 due to the elimination of apertures in support member 34. Apertures extending through support member 34 could create locations of weakness along wiper blade 26. Further, removing apertures and potential locations of weakness from support member 34 reduces the potential for fracture or cracks within wiper blade 26. As discussed, support member 34 can be constructed from a composite material, which can reduce the weight of wiper blade 26, as compared to traditional bridge or beam type wiper blades constructed from steel. The weight of support member 34 is reduced because traditional bridge or beam type wiper blades include more material in the designs and shapes and because composite materials are generally lighter in weight than metallic materials.

Another advantage provided by support member 34 over traditional bridge or beam type wiper blades is that support member 34 has better deflection characteristics in the sweeping directions of wiper blade 26. As shown in FIGS. 2B-2C, support member 34 can include a rectangular cross-section that provides increased stiffness in wiper blade 26 in the sweeping directions, due to the increased width of support member 34 as compared to traditional bridge or beam type wiper blades. Further, the shape of support member 34 and the use of composite materials results in a lower weight wiper blade 26, as compared to traditional bridge or beam type wiper blades. A lower weight wiper blade 26 is advantageous in high-speed operation of WWS 10 and results in less deflection of wiper blade 26 because there is less momentum sweeping in each direction and therefore lower forces and less flexing of wiper blade 26.

In contrast, traditional bridge or beam type wiper blades with higher weights and less stiffness in the sweeping directions experience unwanted deflection while operating WWS 10 at high speeds. As previously described, fastener 40 can be a hollow rivet which provides the benefit of less weight and increased aerodynamic performance of wiper blade 26. Hollow rivets allow air to flow through the internal opening of the hollow rivet, reducing drag and increasing performance of WWS 10 as wiper blade 26 sweeps across windshield 12 of the aircraft. Wiper blade 26 including support member 34, blade element 36, clip 38, fastener 40, and coupler 42 provides many benefits over previous wiper blades that will be appreciated by those skilled in the art.

Discussion of Possible Embodiments

The following are non-exclusive descriptions of possible embodiments of the present invention.

A wiper blade for use on a windshield of an aircraft, the wiper blade comprising: a support member coupled to a blade element; a clip coupled to and surrounding at least a portion of the support member and at least a portion of the blade element; a fastener extending through the blade element and the clip, wherein the fastener secures the clip to the blade element; and a coupler coupled to and surrounding at least a portion of the support member and at least a portion of the blade element.

The wiper blade of the preceding paragraph can optionally include, additionally and/or alternatively, any one or more of the following features, configurations and/or additional components:

The support member comprises a rectangular cross-section; the support member is coupled to the blade element through an adhesive positioned between the support member and the blade element; and the adhesive extends a substantial length of the support member.

The support member is constructed from a composite material, and wherein the blade element is constructed from a rubber material.

The support member is constructed from a carbon fiber reinforced polymer, and wherein the blade element is constructed from a nitrile rubber.

At least two clips are coupled to and surrounding at least a portion of the support member and at least a portion of the blade element, and wherein the at least two clips are spaced equidistance from the coupler.

The clip is constructed from a spring steel, and wherein the clip is configured to exert a clamping force on the support member and the blade element compressing the support member and the blade element together.

The clip is constructed from a rigid polymer material.

The clip comprises: a first side surface; a second side surface parallel with the first side surface; a top surface extending between and connecting the first side surface to the second side surface; a first partial bottom surface extending from the first side surface inward toward a center plane of the clip; and a second partial bottom surface extending from the second side surface inward toward the center plane of the clip and toward the first partial bottom surface.

The top surface includes a curved surface and a flat surface; the first partial bottom surface includes a curved surface and a flat surface; and the second partial bottom surface includes a curved surface and a flat surface.

The curved surface of the top surface is adjacent and contacts the support member, and wherein the curved surface of the first partial bottom surface and the curved surface of the second partial bottom surface are adjacent and contact the blade element.

The clip includes: a first aperture extending through the first side surface at a position below a center plane of the height of the first side surface; and a second aperture extending through the second side surface at a position below a center plane of the height of the second side surface; wherein an axis of the first aperture is aligned with an axis of the second aperture.

The fastener extends through the first aperture of the first side surface and the second aperture of the second side surface, and wherein the fastener protrudes outward from the second aperture and the second side surface.

The fastener is a hollow rivet, standard rivet, bolt and nut, pin and clevis, or pin and clamp.

The coupler is positioned at a center position with respect to a length of the support member, and wherein the coupler extends outward from the support member in a direction opposite the blade element.

The coupler includes: an upper portion with an upper aperture extending through the upper portion of the coupler; and a lower portion with a lower aperture extending through the lower portion of the coupler; wherein a fastener extends through lower aperture of the lower portion of the coupler and through the blade element, securing the coupler to the blade element.

The coupler is configured to be coupled to an end of a wiper arm.

A windshield wiper system for use on a windshield of an aircraft, the windshield wiper system comprising: a wiper comprising a wiper arm and a wiper blade coupled to a first end of the wiper arm, the wiper blade comprising: a support member coupled to a blade element; a clip coupled to and surrounding at least a portion of the support member and at least a portion of the blade element; and a fastener extending through the blade element and the clip, wherein the fastener secures the clip to the blade element; and an actuator comprising an output shaft, wherein the output shaft is coupled to a second end of the wiper arm, and wherein the actuator is configured to oscillate the output shaft to sweep the wiper in an arc across the windshield of the aircraft.

The windshield wiper system of the preceding paragraph can optionally include, additionally and/or alternatively, any one or more of the following features, configurations and/or additional components:

The clip comprises: a first side surface; a second side surface parallel with the first side surface; a top surface extending between and connecting the first side surface to the second side surface; a first partial bottom surface extending from the first side surface inward toward a center plane of the clip; and a second partial bottom surface extending from the second side surface inward toward the center plane of the clip and toward the first partial bottom surface.

The top surface includes a curved surface and a flat surface; the first partial bottom surface includes a curved surface and a flat surface; and the second partial bottom surface includes a curved surface and a flat surface; wherein the curved surface of the top surface is adjacent and contacts the support member, and wherein the curved surface of the first partial bottom surface and the curved surface of the second partial bottom surface are adjacent and contact the blade element.

A controller electrically coupled to the actuator and a gear reduction coupled to and positioned between the output shaft and the actuator, wherein the controller is configured to send electrical signals to and receive electrical signals from the actuator to control rotation of the output shaft of the actuator.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A wiper blade for use on a windshield of an aircraft, the wiper blade comprising:
   a support member coupled to a blade element;
   a clip coupled to and surrounding at least a portion of the support member and at least a portion of the blade element, wherein the clip comprises:
      a first side surface, a second side surface, a top surface, a first partial bottom surface, and a second partial bottom surface;
      wherein the first partial bottom surface extends from the first side surface inward toward a center plane of the clip and the second partial bottom surface extends from the second side surface inward toward a center plane of the clip and toward the first partial bottom surface; and
      wherein at least a portion of each of the first partial bottom surface and the second partial bottom surface are parallel with at least a portion of the top surface;
   a fastener extending through the blade element and the clip, wherein the fastener secures the clip to the blade element; and
   a coupler coupled to and surrounding at least a portion of the support member and at least a portion of the blade element.

2. The wiper blade of claim 1, wherein:
   the support member comprises a rectangular cross-section;
   the support member is coupled to the blade element through an adhesive positioned between the support member and the blade element; and
   the adhesive extends a substantial length of the support member.

3. The wiper blade of claim 1, wherein the support member is constructed from a composite material, and wherein the blade element is constructed from a rubber material.

4. The wiper blade of claim 3, wherein the support member is constructed from a carbon fiber reinforced polymer, and wherein the blade element is constructed from a nitrile rubber.

5. The wiper blade of claim 1, wherein at least two clips are coupled to and surrounding at least a portion of the support member and at least a portion of the blade element, and wherein the at least two clips are spaced equidistance from the coupler.

6. The wiper blade of claim 1, wherein the clip is constructed from a spring steel, and wherein the clip is configured to exert a clamping force on the support member and the blade element compressing the support member and the blade element together.

7. The wiper blade of claim 1, wherein the clip is constructed from a polymer material.

8. The wiper blade of claim 1:
the first side surface of the clip is parallel with the second side surface of the clip; and
the top surface of the clip extends between and connects the first side surface to the second side surface.

9. The wiper blade of claim 8, wherein:
the top surface of the clip includes a curved surface and a flat surface;
the first partial bottom surface of the clip includes a curved surface and a flat surface; and
the second partial bottom surface of the clip includes a curved surface and a flat surface.

10. The wiper blade of claim 9, wherein the curved surface of the top surface is adjacent and contacts the support member, and wherein the curved surface of the first partial bottom surface and the curved surface of the second partial bottom surface are adjacent and contact the blade element.

11. The wiper blade of claim 8, wherein the clip includes:
a first aperture extending through the first side surface at a position below a center plane of a height of the first side surface; and
a second aperture extending through the second side surface at a position below a center plane of a height of the second side surface;
wherein an axis of the first aperture is aligned with an axis of the second aperture.

12. The wiper blade of claim 11, wherein the fastener extends through the first aperture of the first side surface and the second aperture of the second side surface, and wherein the fastener protrudes outward from the second aperture and the second side surface.

13. The wiper blade of claim 1, wherein the fastener is a hollow rivet, standard rivet, bolt and nut, pin and clevis, or pin and clamp.

14. The wiper blade of claim 1, wherein the coupler is positioned at a center position with respect to a length of the support member, and wherein the coupler extends outward from the support member in a direction opposite the blade element.

15. The wiper blade of claim 1, wherein the coupler includes:
an upper portion with an upper aperture extending through the upper portion of the coupler; and
a lower portion with a lower aperture extending through the lower portion of the coupler;
wherein the fastener extends through the lower aperture of the lower portion of the coupler and through the blade element, securing the coupler to the blade element.

16. The wiper blade of claim 1, wherein the coupler is configured to be coupled to an end of a wiper arm.

17. A windshield wiper system for use on a windshield of an aircraft, the windshield wiper system comprising:
a wiper comprising a wiper arm and a wiper blade coupled to a first end of the wiper arm, the wiper blade comprising:
a support member coupled to a blade element;
a clip coupled to and surrounding at least a portion of the support member and at least a portion of the blade element, wherein the clip comprises a first side surface, a second side surface, and a top surface extending between and connecting the first side surface to the second side surface, the top surface includes a curved surface and a flat surface, wherein the curved surface of the top surface is adjacent and contacts the support member; and
a fastener extending through the blade element and the clip, wherein the fastener secures the clip to the blade element; and
an actuator comprising an output shaft, wherein the output shaft is coupled to a second end of the wiper arm, and wherein the actuator is configured to oscillate the output shaft to sweep the wiper in an arc across the windshield of the aircraft.

18. The windshield wiper system of claim 17, wherein the clip further comprises:
a first partial bottom surface extending from the first side surface inward toward a center plane of the clip, the first partial bottom surface includes a curved surface and a flat surface; and
a second partial bottom surface extending from the second side surface inward toward the center plane of the clip and toward the first partial bottom surface, the second partial bottom surface includes a curved surface and a flat surface;
wherein the curved surface of the first partial bottom surface and the curved surface of the second partial bottom surface are adjacent and contact the blade element.

19. The windshield wiper system of claim 17 and further comprising a controller electrically coupled to the actuator and a gear reduction coupled to and positioned between the output shaft and the actuator, wherein the controller is configured to send electrical signals to and receive electrical signals from the actuator to control rotation of the output shaft of the actuator.

* * * * *